S. CHASE.
SIGNALING DEVICE.
APPLICATION FILED FEB. 3, 1913. RENEWED FEB. 3, 1914.

1,091,038.

Patented Mar. 24, 1914.

Witnesses
H. A. Stock.
Frank H. Carter

Inventor
Samuel Chase
By Harry C. Schroeder
his Attorney

UNITED STATES PATENT OFFICE.

SAMUEL CHASE, OF LOS ANGELES, CALIFORNIA.

SIGNALING DEVICE.

1,091,038.  Specification of Letters Patent.  Patented Mar. 24, 1914.

Application filed February 3, 1913, Serial No. 745,919. Renewed February 3, 1914. Serial No. 816,317.

*To all whom it may concern:*

Be it known that I, SAMUEL CHASE, a citizen of the United States, residing at city of Los Angeles, in the county of Los Angeles and State of California, have invented certain new and useful Improvements in Signaling Devices, of which the following is a specification.

This invention relates to a signal, and the principal object of the invention is to provide a signal which may be connected with an automobile to permit the driver of the machine to indicate in which direction he is going to turn the machine. This will prevent the danger of an automobile running into a machine ahead of it.

Another object of the invention is to provide an improved type of signal which is so constructed that a selected signal may be operated while the remaining signal remains in the normal position.

Another object of the invention is to so construct the device that both signals may be caused to operate at once, thus indicating that the machine is going to stop.

Another object of the invention is to provide front lights positioned near the driver's seat in order that the driver may know which signal has been operated by the light at one side being illuminated.

With these and other objects in view this invention consists of certain novel combinations, constructions, and arrangements of parts as will be hereinafter fully described and claimed.

Figure 1:
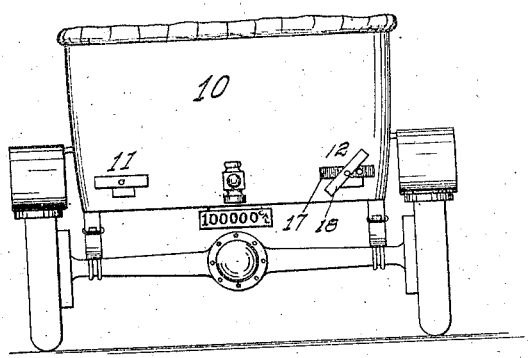
Figures 2, 3:
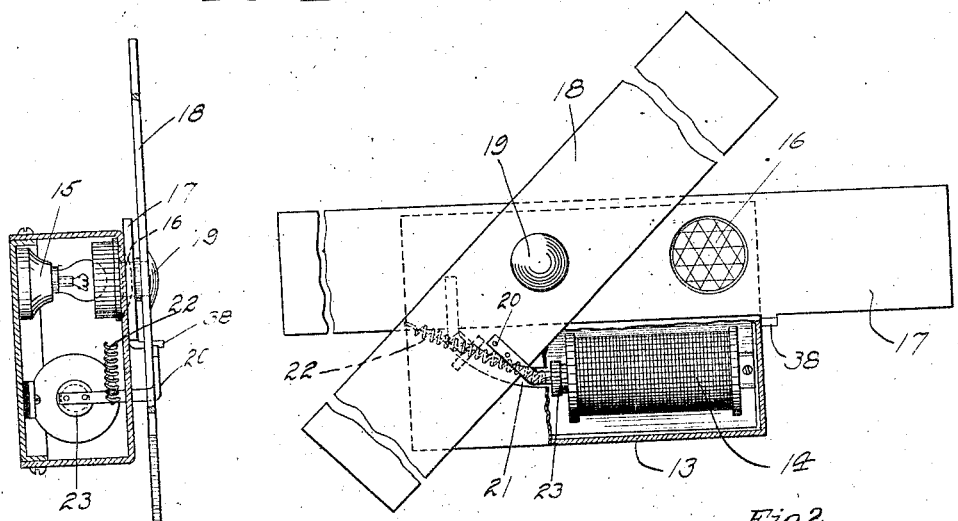
Figure 4:
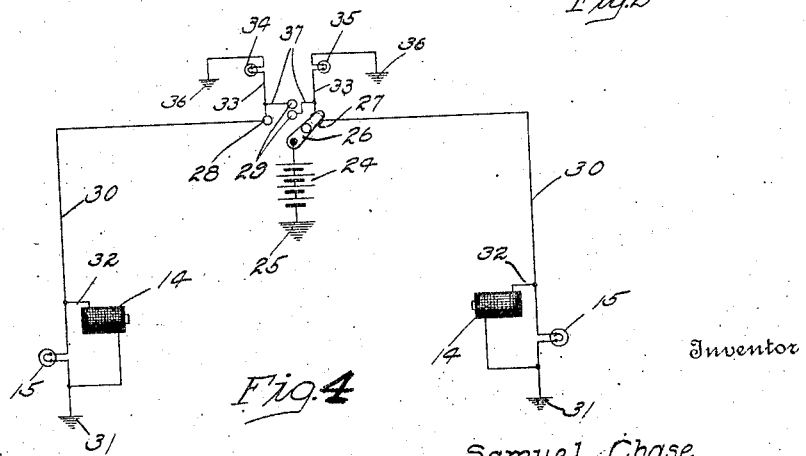

In the accompanying drawing:—Figure 1 is a rear elevation of an automobile provided with the improved signal. Fig. 2 is an enlarged view of one of the signals showing a portion of the housing broken away and showing the movable arm swung from the normal position. Fig. 3 is a vertical sectional view through the device shown in Fig. 2. Fig. 4 is a diagrammatic view showing the electric wiring used in installing this device.

This invention is intended to be used upon an automobile 10 and comprises the signals 11 and 12 secured to the rear of the machine and adjacent the sides thereof. Each of these signals comprises a housing 13 in which there is mounted the electro-magnet 14 and the lamp socket 15, the lamp socket being positioned opposite the bull's-eye 16 so that when the lamp is illuminated the light will shine through this bull's-eye. A stationary arm 17 is secured to the housing and is provided with an opening positioned in alinement with the bull's-eye. A movable arm 18 is pivotally secured to the stationary arm by a rivet 19. This arm 18 is provided with a pin 20 which extends through a slot 21 formed in the front wall of the housing 13. A spring 22 is secured to the housing at one end and to the pin 20 at the remaining end to normally hold the movable arm in the position shown at 11, thus covering the bull's eye and the stationary arm. An armature head 23 is positioned at the inner end of the pin 20 and it will be readily understood that when the magnet 14 is energized that it will attract the armature head, thus swinging the movable plate upon its pivot pin 19 and uncovering the stationary plate and bull's-eye.

It is desirable to have the movable plate painted the same color as the car and the stationary plate a different color so that when the movable plate is swung to the position shown in Fig. 2 the stationary plate will be readily seen. In this manner the signal will attract attention in the day time as well as at night for in the day time the light 15 would not attract the same attention as it would at night. The source of power such as the battery 24 is placed at a convenient point in the car and is grounded at one end as at 25 and connected at the other end with the switch 26. This switch is so positioned that it may be swung selectively on to the switch points 27, 28, or 29, thus making it possible to illuminate a desired lamp 15 or to illuminate both of the lamps. Wires 30 lead from the switch points 27 and 28 through the lamps 15 and are grounded as shown at 31, thus permitting the lamps 15 to be illuminated when the signals are operated. Branch wires 32 lead from the wires 30 to the electro-magnets 14, thus causing the magnets to be energized at the same time the lamps are lighted. It will thus be seen that when the switch is turned to one of the switch points 27 or 28 that the desired lamp will be illuminated and that the desired movable arm will be swung to the position shown in Fig. 2, thus causing the stationary plate to be uncovered. Wires 33 lead from the switch points 27 and 28 through the lamps 34 and 35 positioned at a convenient point in the front portion of the car and are grounded as shown at 36. By this arrangement the lamps 34 and 35 will be selectively illuminated according to the position of the switch 26 and it will thus be possible for the driver to tell which of the signals have been operated by simply looking to see which of the lights 34 or 35 is illuminated. Wires 37 lead from the wires 33 to the switch points 29 so that when the switch 26 is turned to rest upon both of the contact points 29 the two signals will be simultaneously operated, thus indicating that the machine is going to stop. A stop 38 is provided to prevent the movable arm from being swung beyond a desired point by the spring 22.

I have thus provided a device which may be very readily operated and in which the driver of the car can readily tell which of the signals has been operated, thus preventing any danger of the wrong signal being set. This will also indicate to the driver whether the signal is in operation for if the lights 34 and 35 are not illuminated when the switch is turned to rest upon the desired contact members 27 or 28 it will show that the battery is exhausted.

Having thus described the invention what is claimed as new, is:—

A signal comprising a housing, a stationary arm carried by said housing and provided with a bull's-eye, a lamp positioned in said housing in alinement with said bull's-eye, a movable arm carried by said housing, a pin extending from said movable arm through a slot in said housing and provided with an armature head at its inner end, an electro-magnet positioned in said housing for attracting said armature to move said movable arm, a spring having one end connected with said housing and the remaining end with said pin for normally holding said movable arm in a position to cover said stationary arm, and means for illuminating said lamp and energizing said electro-magnet.

In testimony whereof I affix my signature in presence of two witnesses.

SAMUEL CHASE.

Witnesses:
LEROY C. NIMMO,
R. W. OLIVER.